United States Patent [19]

Fu Lu et al.

[11] Patent Number: 4,615,889

[45] Date of Patent: Oct. 7, 1986

[54] COLLAGEN SAUSAGE CASING AND METHOD OF PREPARATION

[75] Inventors: Mou-Ying Fu Lu, Lake Bluff, Ill.; Larry L. Hood, Bridgewater, N.J.

[73] Assignee: Devro, Inc., Somerville, N.J.

[21] Appl. No.: 748,875

[22] Filed: Jun. 26, 1985

[51] Int. Cl.$^4$ .......................... A23L 1/31; A23L 1/317
[52] U.S. Cl. .................................... 426/140; 426/277; 426/278
[58] Field of Search ........................ 426/140, 277, 278

[56] References Cited

U.S. PATENT DOCUMENTS

| | | | |
|---|---|---|---|
| 3,932,677 | 1/1976 | Burke | 426/277 |
| 4,196,223 | 4/1980 | Shank | 426/278 X |
| 4,526,580 | 7/1985 | Crooks | 426/277 X |

*Primary Examiner*—Arthur L. Corbin
*Attorney, Agent, or Firm*—Michael Q. Tatlow

[57] ABSTRACT

A collagen sausage casing having improved clarity and weeping properties and a method of making the casing is disclosed. The casing contains from 50 to 80% by weight of bovine collagen and from 20 to 50% by weight of an acidified brine extracted pork skin.

6 Claims, No Drawings

COLLAGEN SAUSAGE CASING AND METHOD OF PREPARATION

The present invention relates to an improved collagen sausage casing and to a process of preparing that casing.

BACKGROUND OF THE INVENTION

Reconstituted collagen is widely used in the manufacture of tubular sausage casings. The collagen used in these casings is usually derived from the corium layer of bovine hides. The bovine hides are processed to remove the collagen fibers or fibrils from the hides, usually by an acid-swelling process. The acid gel made by this process is then extruded into a casing and neutralized by the injection of gaseous ammonia or by contact with a liquid salt solution. The casing is washed in water to remove the neutralization salts and then treated with a crosslinking agent and plasticized. Examples of such processes are disclosed in U.S. Pat. Nos. 3,535,125 and 3,821,439. Although such casings have been commercially successful, they suffer certain disadvantages. These disadvantages relate to the inherent chemical nature of the collagen. As collagen is a hydrophilic polymer of amino acids, it is capable of absorbing large amounts of free water and swelling. The extent of the ability of collagen to swell and to form gels is dependent on two factors in particular. These are the pH of the gel and the chemical treatment processes to which the collagen has been subjected prior to the formation of the gel. Processes such as liming eliminate certain hydrophilic residues in the collagen and alter the swelling properties of the native collagen. Casings prepared from limed hides or hides which have been dehaired with lime have a tendency to absorb water from the meat emulsions with which they are stuffed. The absorbed water hydrates the casing, the casing becomes opaque, thereby blocking the transmission of meat colors through the casing. Transparent casing would be more acceptable to the meat industry, as it would more clearly show the meat color of the meat emulsion. It is possible to improve the translucency of the casing by using chemical cross-linking agents to make the casing more water resistant. Such agents, however, have a tendency to make the casing tougher and, therefore, more difficult to chew.

Another characteristic of the collagen casing that could be improved is the tendency of the casing to weep. Weeping is the passage of a large amount of moisture from the meat emulsion through the casing where it has a tendency to bead on the surface of the casing. Weeping is undesirable, because it is not attractive to consumers in selecting sausage from retail stores, and because it also provides moisture which allows various microorganisms to grow on the surface of the casing which leads to spoilage of the sausage.

The following patents disclosed the use of collagen derived from pork skin. U.S. Pat. No. 4,196,223 discloses a process of preparing sausage casing from pigskin. The collagen is prepared from the pigskin by swelling the pigskins with dilute hydrochloric acid, grinding the pigskins and homogenizing the ground pigskin into a gel which is then extruded. The casing produced by this process does not have adequate strength to be used in commercial stuffing equipment.

Canadian Pat. No. 695,243 discloses the manufacture of a water-dispersable collagen from fresh pigskins to form a water-dispersable collagen which would be useful as a dip coating. The product of this patent is not a sausage casing.

SUMMARY OF THE INVENTION

The present invention provides an improved collagen sausage casing which is extruded from a gel containing a mixture of bovine collagen and a gel derived from brine extracted pork skin. The collagen casing made by the present process has substantially better clarity and weeping properties than casing made from 100% bovine collagen but it is still equivalent in strength and tenderness to 100% bovine collagen casings.

DETAILED DESCRIPTION OF THE INVENTION

The collagen casing of the present invention is extruded from a gel which contains both bovine collagen and the acidified brine extracted pork skin. The extrudable gel can be prepared by combining ground acidified brine extracted pork skin and ground buffered bovine hide corium and acid swelling the combined materials to form an extrudable gel or by forming separate gels and combining the gels to form a single extrudable gel. In either case, the gel prepared is then used to extrude casing using the equipment which is well known in the art. Post-extrusion processing of the casing of the present invention is identical to the post-extrusion process that is used when processing a casing made with a 100% bovine collagen gel. The post-extrusion processing that can be used with the present gels is described in U.S. Pat. No. 3,535,125.

Pork Skin Gel Preparation

Fresh pork skin, in addition to collagen, will contain some carbohydrate materials and 15% to 25% fat. It may also contain some small amounts of noncollagenous proteins. For the purposes of this specification and claims, the term "acidified brine extracted pork skin" will be used to define the material that is added to the bovine collagen in the practice of the present invention and which is prepared by the process hereinafter described. As indicated above, the acidified brine extracted pork skin gel will include material other than collagen. It is believed that the lack of lime treatment as well as the presence of normal skin constituents (i.e., carbohydrate material, fat and noncollagenous protein) in the casing product results in the improved casing of the present invention. Pork skins derived from freshly slaughtered hogs are employed as the source of the acidified brine extracted pork skin. The preferred sources of the skin are the belly, the fat back and the ham of the carcass. The skin from the belly portion of the animal is most preferred. Skin is initially cleared of all visible adhering flesh, tendon, muscle and/or fat generally by mechanical separation from underlying tissue with the aid of a skinning device, hide puller or by hand removal. Skins for this process must be selected to avoid those with obvious, severe tissue defects such as warts, parasites, bruises, extensive scarring, dehydration or freezing. The skins are placed in a bath which contains a saturated solution of sodium chloride. The skins are held at refrigerated temperature, completely immersed in the brine or saturated salt solution, for approximately 24 hours with constant agitation. The mixture is agitated either mechanically with a rotating blade or by inserting an air sparger into the mixture. After the 24 hour holding period additional solid sodium chloride is added to the bath to equal 10% of the salt originally used in the bath. The skins remain immersed in a super saturated salt solution for an additional 24 hour period with constant agitation. The skins may remain in the brine bath for up to 72 hours without any adverse effects. The super saturated brine solution removes a substantial amount of the fat from the skins, as well as removing some of the non-collagenous, soluble protein from the skins. The skins are then held for five to 21 days under refrigerated conditions while the salts and water drain from the skins. The preferred storage period is 5-7 days. Considerable change occurs to the tissue as a result of extraction and storage. For instance, the pH rises, while protein, carbohydrate, free ammonia, amino acids, nucleotides, natural tissue buffer salts and extraneous fat are rendered soluble and are flushed away by the dripdrain period in refrigerated storage. Table I summarizes the extensive compositional changes evoked in the fresh pork skin as it is converted into a functionally important adjunct in sausage casing gels.

After the salts are drained from the skins, the skins are washed with flowing water for approximately four hours at room temperature. The skins will continue to be washed until the conductivity of the exiting wash water is equal to the conductivity of the incoming wash water, and no more salt is being removed from the skins.

The skins are then subjected to the acidification process. The acidification process removes additional undesirable material from the pork skins and stabilizes the pork skins from deterioration in storage. The skins are then placed in a tank or drum of the type used by tanneries and acidified and further extracted with an acid solution at a pH of from 3 to 5. A pH of $4.5 \pm 0.2$ is preferred. The acid is citric acid, and sodium citrate is used as a buffer. The solution to hide weight ratio is from 2:1 to 4:1. The skins are held in the buffer for between six and 12 hours, preferably eight hours, and are again washed to remove residual acid from the skins. The washing is continued until the solution conductivity of the exiting water equals the solution conductivity of the incoming wash water. The final water wash serves to further extract citrate and water soluble components in the skins which would interfere with the full utilization of the skins in the casing manufacturing step. The acidified and washed skins are stored at $2°$ C.$\pm 1°$ C. for 1-21 days to permit cooling and complete equilibration of pH within the skins. The preferred storage time is 5-6 days.

The acidified brine extracted skins are prepared for use in the casing manufacturing step by cutting into $\frac{1}{2}$ to 4 square inch sections and reduced to pulp by passing through a meat grinder with $\frac{1}{4}''$ holes. It is important during grinding to maintain the skin material below $20°$ C. This may be done by adding dry ice to the skins as they are fed to this grinder. Hide so treated and prepared is suitable for use in preparing sausage casing if held for 0-10 days at $2°$ C.$\pm 1°$ C. The preferred storage interval is 0-5 days.

The finely ground hide is swollen with an acid, such as hydrochloric or lactic acid to form an extrudable gel. The process of forming the gel with the acidified brine extracted pork skin is generally identical to the process used in forming gels from bovine collagen.

Bovine Hide Preparation

The preparation of the collagen gel from the bovine hide is generally the process that has previously been employed to preface such collagen gels. The process is exemplified in U.S. Pat. Nos. 3,535,125 and 3,821,429. A typical process is detailed below.

Hides from freshly slaughtered animals are weighed and batched into lots of 2700 kilograms. They are washed for three hours in continuously running water at a temperature of $20°$ C. to $21°$ C.

To a paddle vat of suitable capacity is added 6130 kilograms of water and the 2700 kilograms of washed hides.

Twenty-two kilograms of sodium carbonate are added to the vat and the paddle run for one and one-half hours.

Fifty-four kilograms of sodium sulfahydrate are then added and the paddle run for a further one hour, after which time, 8 kilograms of sodium sulfide are added. The paddle is run for 15 minutes before a further 54 kilograms of sodium sulfahydrate, plus 81 kilograms of hydrated lime are added. After this addition, the paddle is run for six and one-half hours.

At the end of this time, the vat is drained of chemical solution, and the hides are flood washed in $21°$ C. water for three hours. They are then removed for a first defleshing.

The fleshed hides are returned to the paddle vat, washed clean with well water at $15°$ C., then drained.

The paddle vat is recharged with 6130 kilograms of water and 22.5 kilograms of sodium bicarbonate, plus 81 kilograms of hydrated lime are added. The paddle is run for 12 to 18 hours.

The hides are removed from the vat and, after any needed trimming, are split on a leather slitting machine to separate the grain layer from the corium.

The corium layer is sided (split in half), given a second defleshing and placed in a drum for a final 30 minute wash with well water. A typical yield of corium is 700 kilograms.

Corium Buffering

The bovine corium collagen layer, as produced in the above, must be buffered to pH 4.6 before being further treated to render it suitable for use in making collagen casing. The buffering is done by the following process:

A large fiberglass drum (capacity 2000 kg) is charged with 700 kilograms of corium collagen prepared as described above.

Eleven hundred and twenty (1120) kilograms of tempered ($20°$ C.) water and 3.5 kilograms of ammonium sulfate are added, and the drum is rotated for one hour and 50 minutes.

The treatment solution is drained, the drum recharged with the same weights of water and ammonium sulfate, and the hide further treated for a second period of one hour and 50 minutes.

At the end of this time, the treatment solution is drained, and the corium is flood washed with tempered water for two and one-half hours using a flow rate of 120 liters of water/min.

After complete draining, the drum is charged with 1120 kilograms of tempered ($20°$ C.) water to which is added 4.9 kilograms of citric acid and 616 kilograms of sodium citrate. The drum is rotated for 12 to 14 hours.

Periodic (two hour) pH measurements are taken on the buffer solution. Citric acid additions are made as needed based on the results of these two hour tests to maintain the pH at 4.6.

At the end of the buffer treatment, the buffered corium is washed to remove residual citrate before being stored under refrigeration until use.

The hide corium obtained is cut into ½ to 4 square inch sections and reduced to a pulp by passing these cut squares through a meat grinder. The samples are passed through the meat grinder three times with each successive pass being a finer grind. The first and second passes being through 18 and 8 millimeter holes, respectively, and the final grind is through holes 1.5 millimeters in diameter. During the grinding process, the pulp is kept at a temperature below 20° C. This temperature can be obtained by adding crushed ice to the hides as they are fed into the grinder or by using a refrigerated grinder.

Blending of Brine Extracted Pork Skin and Bovine Collagen

It has been found to be most advantageous to form the gel by blending the ground acidified brine extracted pork skin and the ground bovine corium in the desired proportions and swelling the blended materials with acid to produce the extrudable gel. It is also possible and at times more expeditious to form individual gels, a bovine corium gel and an acidified brine extracted pork skin gel, and to mix these performed gels together in the desired properties. With either procedure to form the extrudable gel, the gel of the present invention contains ratios of approximately 20% to 50% of the acidified brine extracted pork skin and 80% to 50% of the bovine collagen. If excessive amounts of the collagen prepared from a brine extracted pork skin is used, the tensile strength of the casing prepared is too low to be used satisfactorily in the stuffing operations to form sausages.

In the following examples Agtron Values were determined as the measure of clarity or translucency of the casing. The Agtron Value was determined by the following test procedure. The measurements of clarity or translucency are performed on a M-500-A Agtron Direct Reading Reflectance Spectrophotometer. This unit is manufactured by Magnuson, Inc. The Agtron Spectrophotometer consists of two light sources which are gaseous discharge tubes for illuminating the sample. There are interference filters for selecting one of four monochromatic lines from the sources. It has been determined that the present casings normally give the most meaningful results when tested on the Agtron with the blue color mode. In conducting the test, a M-300-A sample holder and light source is used in conjunction with the M-500-A primary unit. Casings made by the various examples in the present application are filled with warm water at a temperature from 70° F. to 80° F., and the ends of the casings are tied. The casing length is usually about 4". The diameter of the water-filled casing is typically the same as when filled with a meat emulsion. A number of casings are set in the sample cup. Usually about 7 casings are sufficient to fill the cup. The Model M-300-A sample holder includes a mask which covers only the central region of the casings so that the entire mask is filled with casing material. The unit is calibrated before the tests are commenced. The calibration procedure includes the following steps:

1. The instrument is turned on with the color mode selector on the blue mode and allowed to warm up for approximately 30 minutes.

2. The sample cup is placed over the viewing area, and the calibration disc 00 is inserted into the unit.

3. The zero control is set for a meter reading of "zero".

4. The calibration disc 00 is replaced with calibration disc 44.

5. The standardized control is set to obtain a meter reading of "100".

The samples are then placed in the sample cup assuring that the entire viewing area exposed by the mask is completely filled with water containing sausage casing links. The calibration disc 00 is then placed over the water filled links in the sample cup, and the instrument reading is obtained.

The weeping characteristics of the casing are determined by the procedure set forth below. Casing samples 21 days old are employed. A sample 17 centimeters in length is cut from a portion of casing. The cut sample is flattened and measured so that a 15 centimeter long sample is actually used in the test. The sample of casing is filled and a plug is inserted into one end of the sample of the casing. The remaining end of the casing is connected to a water reservoir, and the casing is filled with water. It may be necessary to unplug one end of the casing to allow any trapped air to escape. The casing is placed on a test stand. The water-filled casing remains on the test stand for 30 minutes. A piece of weighed filter paper is wiped across the entire surface of the casing sample and the test stand, and the filter paper is weighed immediately after the casing is wiped. The weeping is defined as the amount of water which has been absorbed from the surface of the casing by the filter paper.

EXAMPLE I

Pork Skin Preparation

Approximately 350 lbs. of skin is removed from various carcass locations on freshly slaughtered and dehaired hogs. The skin is initially cleared of all visible adhering flesh, tendon, muscle and fat generally by mechanical separation from underlying tissue with the aid of a skinning device, hide puller or by hand removal. The skin is immediately washed, to remove adhering loose non-skin material and placed into a stainless steel extraction vessel (400–500 gal. capacity) previously charged with 614 lbs. of a salt (NaCl) solution containing 74 parts water and 26 parts salt and adjusted to a temperature of 40° F.±2.5° F. The saltometer reading is 98–99%. The entire mixture is agitated by inserting an air sparger into the mixture. The air sparger is operated with clean compressed air flowing at the rate of 150–200 liters per minute. At the end of 21 hours the saltometer reading has fallen to 86–87% and approximately 17 lbs. of finely ground solid NaCl is added to the mixture and agitation resumed. After 30 minutes, the saltometer reads 96–98%. Agitation is continued for 24 hours. The extraction bath temperature is maintained at 40° F.±2.5° F. The skins are then removed from the bath and stored in a large plastic box (125 ft.$^3$) with a perforated bottom to permit drainage. The skins are stored at 40° F.±2.5° F. for 5 days. The yield of pork skin at this stage is 411.4 lbs. or 117% of the original starting weight. Table I summarizes the compositional change of fresh skin attendant to the salt extraction process. Additional changes to the brined skins which are fostered by further extraction with an acidic solution of citric acid and sodium citrate are also shown in Table I.

The brine extracted pork skins are then placed into a 2,200 liter cylindrical vessel of the type commonly used in tannery treatment processes and washed to remove NaCl and extractable components of the original tissue. Approximately 1,200 liters of tap water is added to the vessel and the vessel is rotated at approximately 2-3 rpm. for 4 hours while a thru wash of 10° C. tap water is maintained at 100 liters per minute. The conductivity of exiting wash water is equal to incoming water after 4 hours, signaling the completeness of washing. The vessel is drained of all liquid, and acid extraction is begun as follows. The washed, brine-extracted pork skins are acidified by placing them into a solution containing sodium citrate and citric acid at pH 4.5±2. The solution to hide ratio is 2:1. The solution contains 375 liters of water containing 1.22 kg. citric acid and 1.10 kg. of anhydrous sodium citrate. The vessel is again sealed and rotated for 8 hours, during which time the pH is constantly monitored and maintained at pH 4.5±0.2 by additions of small quantities of citric acid (0.1-0.3 kg.) at hourly intervals, if needed, until completion of the acidification process. The vessel is again emptied of its liquid components, and the skins are washed with 10° C. tap water at a flow of 100-120 liters per minute while the vessel rotates at 2-3 rpm. The water flow is stopped, leaving the vessel filled to capacity while rotation continues for one hour. The final water wash, with its associated tumble, serve to further extract citrate and water soluble components of the pork skins which would interfere with the full utilization of the pork skins in the casing manufacturing step. The acidified and washed pork skins are stored at 2° C.±1° C. for 5 days to permit cooling and complete equilibration of pH within the skins. The final yield of pork skin is 506 lbs. and their pH is 4.5±0.2. After equilibration is complete, the pork skins have changed considerably in comparison to the original post slaughter skin, as shown in Table I. The brine-extracted and acidified skins are prepared for use in the casing manufacturing step by cutting into ½ to 4 square inch sections and reduced to pulp by passing through a meat grinder with ¼" holes. It is important during grinding to maintain the skin material below 20° C. This may be done by adding dry ice to the skins as they are fed to this grinder.

EXAMPLE II

Preparation of Extrusion Mass

The finely ground brine-extracted pork skin is swollen with hydrochloric acid and blended with cellulose fibers as described in Example V of U.S. Pat. No. 3,123,482. To 47.89 kg of the acidified brine-extracted pork skin (13.88 kg dry solids prepared in Example I above) is added 99.6 kg water at 12°±2° C. The mixture is processed through a high speed shredding mill (Mikro-cut, manufactured by A. Stephen and Sons; Hameln (Weser), Germany) to produce an aqueous slurry. In a stainless steel tank, 2.77 kg of cellulose fibers are dispersed in 149.4 kg of water. To this is added 0.89 kg of 37% hydrochloric acid with complete mixing. The cellulose and acid mixture is blended with the brine-extracted pork skin dispersion as outlined in Example V of U.S. Pat. No. 3,535,125. The extrusion mass so obtained has the following composition:

hide solids ... 4.62
cellulose ... 0.926
hydrochloric acid ... 0.11

EXAMPLE III

To 107.6 kg of ground delimed bovine hide particles (32.41 kg hide solids prepared as in Example IV of U.S. Pat. No. 3,535,125) is added 263.8 kg of water at 12°±2° C. The mixture is then further processed as in Example II above.

A cellulose dispersion is prepared using 6.488 kg cellulose, 395.7 kg of water and 3.83 kg of 37% hydrochloric acid. Blending of the cellulose-acid dispersion is carried out as described in Example V of U.S. Pat. No. 3,535,125. The mixture has the following composition:

hide solids ... 4.62
cellulose ... 0.926
hydrochloric acid ... 0.203

EXAMPLE IV 300 kg of swollen acidified brine-extracted pork skin (prepared as in Example II) is blended with 700 kg of swollen lime treated collagen (prepared as in Example III) for 30 minutes in a large conical "Nauta-type" mixer (Day Mixing Company, Cincinnati, Ohio). The mass is completely uniform and the pork skin and limed collagen components are no longer distinguishable from one another. The mixture is incubated for eighteen to twenty-four hours while being maintained at 12°±2° C. The mixture is then homogenized using a total of 3600 psig through a two-stage homogenizing valve to form an extrudable gel having the following compositions:

hide solids ... 4.62
cellulose ... 0.926
hydrochloric acid ... 0.175

The gel can be extruded by conventional means to form a casing having improved clarity and weeping properties.

EXAMPLE V 14.58 kg of ground delimed hide (prepared as in Example IV of U.S. Pat. No. 3,535,125) and 6.25 kg of acidified pork skin (prepared as in Example I above) are added to a stainless steel tank and mixed with 155 liters of water. The mixture is processed through the Mikro

TABLE 1

Composition of Pork Skin Following Extraction with NaCl Bovine and Acidification with A Solution of Sodium Citrate and Citric Acid

| Skin Material/Treatment | pH | Total Solids (%) | Protein[a] (%) | Fat[a] (%) | Collagen[a] (%) | Ash[a] (%) | $NH_3$[a] (ppm) | NaCl[a] (%) | Carbo-[a] hydrate (%) |
|---|---|---|---|---|---|---|---|---|---|
| 1 hr Post-slaughter | 7.2 | 52.26 | 53.1 | 39.47 | 45.2 | 1.07 | 22.8 | >0.1 | 6.3 |
| Brine Extracted Skin-5 Days Post Extraction | 8.16 | 57.01 | 32.8 | 35.4 | 34.4 | 23.2 | 52.3 | 19.0 | 8.6 |
| Acidified-brine extracted Skin-3 days Post acidification | 4.53 | 35.78 | 51.8 | 34.97 | 56.5 | 0.4 | 10.3 | 0.4 | 12.8 |

[a]Computed on a dry solids basis.

cut. In a stainless steel tank 4.39 kg of cellulose is mixed with 2.49 liters of 37% hydrochloric acid. Blending of cellulose-acid dispersion with the collagen-pork skin slurry is performed as described in Example V of U.S. Pat. No. 3,535,125 and the mixture is homogenized using a total pressure of 3600 psig through a two stage homogenizing valve. The extrusion mass so obtained has the following composition:

hide solids . . . 4.63
cellulose . . . 0.926
hydrochloric acid . . . 0.175

Extrusion

The homogenized extrusion mass prepared as described above is extruded in accordance with Example VI in U.S. Pat. No. 3,535,125. Casing that is prepared with a ratio of 3 parts acidified pork skin to 7 parts delimed bovine corium is dramatically improved in several characteristics as compared to casing prepared only from delimed bovine corium alone (as per U.S. Pat. No. 3,535,125). The target layflat variation is the difference between the desired width dimension of the flattened casing and actual width of a casing sample. The variation should be as small as possible and is an indication of the ability to control the diameter of the casing. These are as follows:

| | Raw Material Source | Agtron Clarity | Weeping (mg H$_2$O) | Casing ribbon target layflat variation |
|---|---|---|---|---|
| 1. | Pork skin & bovine corium | 51 | 300 | 2.1% |
| 2. | Bovine corium | 67 | 460 | 4.1% |

Such dramatic changes induced by co-extrusion of acidified pork skin and delimed bovine corium result in improved stuffing characteristics (reduced weight variation, viz less layflat variation), shelf life (reduced weeping) and consumer acceptance (improved clarity). There can be no doubt that such improvements result in a casing product of far greater utility and value than theretofore was possible with just bovine corium alone. The advantages derived from using pork skin are somewhat dependent upon the amount that one uses. For instance, as shown in Table 2 below, changing the relative proportion of pork skin to corium in the extrusion mass of Example IV produces variation in clarity, weeping and tenderness as shown by wet breaking strength values. The final ratio of pork skin selected is determined largely by needs of the manufacturer and application in sausage production.

Example VI

A series of gels containing different percentages of extracted pork skin and bovine collagen were prepared as in Example V and were formed into tubular collagen sausage casings. The casings were tested for Agtron Value, breaking strength and weep value. The results are shown in Table 2 below.

TABLE 2

| % Extracted Pork Skin | Agtron Value | Break Strength (grams) | Weep Value (mg) |
|---|---|---|---|
| 0 | 67 | 547 | 460 |
| 10 | 59 | 612 | — |
| 20 | 55 | 617 | 375 |
| 30 | 51 | 639 | 300 |
| 40 | 48 | 518 | 250 |
| 50 | 41 | 555 | 100 |
| 75 | 28 | 395 | <25 |

We claim:
1. A method of forming a collagen sausage casing comprising forming an extrudable gel in which the solids content of said gel comprise from 50 to 80% by weight of bovine collagen and from 20 to 50% by weight of acidified brine extracted pork skin and then extruding said gel to form a tubular casing.

2. The method of claim 1 in which the extrudable gel is formed by combining ground bovine hide, corium and ground acidified brine extracted pork skin to form a mixture, contacting the mixture with an acid to swell the collagen in said mixture and homogenizing the mixture.

3. The process of claim 2 in which solids content of said extrudable gel contains 30% acidified brine extracted pork skin and 70% bovine hide collagen.

4. A method of claim 1 in which and the extrudable gel is formed by forming a first gel from collagen derived from the corium layer of bovine hide, forming a second gel from acidified brine extracted pork skins and thoroughly blending the first and second gels in a ratio of from 50 to 80% by weight of the first gel and from 20 to 50% by weight of the second gel.

5. The method of claim 1 in which the acidified brine extracted pork skin gel is formed by extracting pork skin with a solution of sodium chloride for a period of from 10 to 48 hours, washing the pork skin to remove residual sodium chloride, treating the pork skins with an acid solution at a pH of from 3 to 5 for a period of from 6 to 12 hours and washing the skins with water to remove excess acid.

6. A collagen sausage casing comprising from 50 to 80% of collagen derived from the corium layer of bovine hide and from 20 to 50% acidified brine extracted pork skin.

* * * * *

UNITED STATES PATENT AND TRADEMARK OFFICE
CERTIFICATE OF CORRECTION

PATENT NO. : 4,615,889

DATED : Oct. 7, 1986

INVENTOR(S) : Mou-Ying Fu Lu and Larry L. Hood

It is certified that error appears in the above-identified patent and that said Letters Patent is hereby corrected as shown below:

Column 10, line 36: "in which and the" should read
--in which the--.

Signed and Sealed this

Thirteenth Day of October, 1987

Attest:

DONALD J. QUIGG

Attesting Officer

Commissioner of Patents and Trademarks